United States Patent [19]

Knaebel

[11] Patent Number: 4,609,073
[45] Date of Patent: Sep. 2, 1986

[54] PROGRESSIVE DISTRIBUTOR FOR LUBRICANTS

[76] Inventor: Horst Knaebel, Friedenstr. 10a, D-4005 Meerbusch 1, Fed. Rep. of Germany

[21] Appl. No.: 725,948

[22] Filed: Apr. 22, 1985

[30] Foreign Application Priority Data

Apr. 30, 1984 [DE] Fed. Rep. of Germany ....... 3416041

[51] Int. Cl.$^4$ .............................................. F16N 27/00
[52] U.S. Cl. ..................... 184/7.4; 417/349; 91/191
[58] Field of Search .................. 184/7.4; 417/349; 137/624.14; 91/402, 325, 320, 191; 92/858

[56] References Cited

U.S. PATENT DOCUMENTS

| | | | |
|---|---|---|---|
| 3,467,222 | 9/1969 | Gruber | 184/7.4 |
| 3,631,879 | 1/1972 | Larson | 137/624.14 |
| 3,921,760 | 11/1975 | Brownrigg | 184/7.4 |
| 4,180,090 | 12/1979 | Bemba | 184/7.4 X |

Primary Examiner—Leonard E. Smith
Attorney, Agent, or Firm—Horst M. Kasper

[57] ABSTRACT

A progressive distributor 1 for lubricants is provided, where the lubricant is fed in under pressure via a joint channel 20 and then discharged in several discharge channels and ports 25 to 28. At least two successively disposed piston elements 4, 5 are each provided with a piston 8 in each case shiftable between two end positions in a cylinder bore 7 and provided with control grooves 9, 10. The piston subdivides the cylinder bore 7 into two outer metering chambers 17, 18 and at least one intermediately disposed control chamber 19. The piston elements 4, 5 are connected to each other such that the pistons 8 are shifted successively and that lubricant is transported from a metering chamber 17, 18 via a control chamber 19 to an output 25 to 28. In order to damp the piston 8 of the progressive distributor 1 in the respective end positions and in order to provide a forced circulation of the lubricant with a flushing of the connecting channels 21 to 24 and the metering chambers 17, 18 and thus in order to ensure a safe ventilation, each metering chamber 17, 18 is provided with two separate from each other channels 21, 22, 23, 24 which form an input feed channel 21, 22 and an output discharge channel 23, 24. The input feed channel 21, 22 is connected permanently to the metering chamber 18, whereas the output channel 23, 24 can be separated from the metering chamber with a piston surface under formation of a control edge 29.

18 Claims, 13 Drawing Figures

PROGRESSIVE DISTRIBUTOR FOR LUBRICANTS

BACKGROUND OF THE INVENTION

1. Field of the Invention

The present invention relates to a progressive distributor for lubricants which are fed via a joint channel under pressure successively to several output points. The progressive distributor comprises at least two successively connected piston bore elements with each having a piston which is provided with control grooves and can be slipped between two end positions in the cylinder bore. The piston subdivides the cylinder bore into two outer metering chambers and at least one intermediate control chamber.

2. Brief Description of the Background of the Invention Including Prior Art

Such progressive distributors for lubricants are known for example, from the German Patent Applications Laid Out Nos. 1,475,550, 1,902,587 and 2,437,473. The lubricant fed to such a progressive distributor via a joint channel under pressure and running into individual metering chambers is distributed via the pistons successively to individual lubricating locations. In this case, the pistons mutually control each other such that discharge of the lubricant of the piston of the second piston element is provided after discharge of the lubricant via the piston of the first of the successively connected disk-like piston elements. Then, another new lubricant discharge via the piston of the first piston element follows the discharge of lubricant via the piston of the second piston element. In particular, the relatively long connection channel between the metering chamber of the second piston element and the metering chamber of the first piston element can result in operating disturbances in case of such a progressive distributor since a part of the lubricant disposed in the connection channels is only moved back and forth.

In particular, in cases of lubricants with high penetration, the results are hardening or, respectively, bleeding of the lubricant. The same disadvantage also occurs in case of a change of the lubricant. This results finally in such a large flow resistance that the distributor becomes blocked. Furthermore, enclosed air can hardly be removed in these distributors, which also results in interferences with the functioning of the apparatus. Due to the fact that in the case of the known progressive distributors the lubricant leaves the metering chamber in each case via the same channel by which it is fed into the metering chamber, the connection channel up to the metering chambers includes dead zones where no exchange of the lubricant occurs. The piston of each individual piston element carries at its three front faces in each case a stepped tenon, which on one hand determines the final position of the piston in each case and which assures on the other hand that a pressure effective surface is available at the piston for allowing the lubricant to flow in. Contact surface can result at the beginning in delays based on the so called "adhesive effect". In case of high operation frequencies, the pistons, or respectively, their tenons, result in considerable contact noise since no damping of the final positions occurs.

A progressive distributor is known from the German Patent Application Laid Open DE-OS No. 2,917,883 where the individual cylinder bores are disposed relative to each other such that the connection channels can be kept short and, in particular, can be kept at equal length. This reduces the passage flow resistance and assures that lubricant is not moved back and forth in the connection channel. However, this is associated with the precondition that the volume in the connection channels is smaller than the metering volume. Very small metering volumes thus cannot be realized with such a distributor while maintaining the above mentioned advantages. The other indicated disadvantages of the known progressive distributors are however also present in this distributor. Included air cannot escape based on the compressibility.

In addition, the progressive distributor with the short connection channels requires a high expenditure for installation. A later occurring change in the number of the lubricant output bores is not possible in this case.

SUMMARY OF THE INVENTION

1. Purposes of the Invention

It is an object of the present invention to provide a progressive distributor with at least two successively connected piston elements, where the pistons are damped in the respective end positions.

It is a further object of the present invention to provide a progressive distributor including two pistons, which assure flushing of the connection channels and of the metering chambers based on forced circulation and which thus assure a guaranteed ventilation.

It is another object of the present invention to provide a progressive distributor which runs automatically and which provides desired amounts of lubricant depending on the input pressure in a four cycle set-up.

These and other objects and advantages of the present invention will become evident from the description which follows.

2. Brief Description of the Invention

The present invention provides a progressive distributor for lubricants which comprises metering chambers and at least two successively connected piston bore elements. Each piston bore element is provided with a piston which can be slid between two end positions and which is provided with control grooves. The piston subdivides the piston bore element into two outer metering chambers and at least one intermediate control chamber. Two separate channels form a feed channel and a discharge channel connected to each metering chamber. A control edge is formed in a wall of the metering chamber for interrupting the connection between the metering chamber and discharge channel based on the motion of the piston such that the several channels connecting the piston bore elements result in a successive shifting of the pistons, thereby transporting lubricants from a metering chamber via a control chamber to a discharge port.

A discharge channel can be provided as an annular channel surrounding a metering chamber.

A notch extending in axial direction can be disposed on a piston on the side toward a metering chamber.

The progressive distributor for lubricants of the present invention can further comprise a narrowing ball shaped end section, a narrowing conical shaped end section or a narrowing step-shaped end section of a piston end directed toward a metering chamber.

The present invention in another embodiment provides a progressive distributor for lubricants comprising a casing, a first piston having a first groove and a second groove to provide respective control chambers, a second piston having a third groove and a fourth groove to provide respective control chambers and a joint channel feeding pressurized lubricant to the distributor. A first metering chamber is disposed in the casing and is associated with a first end of the first piston. A first feed connection connects the first metering chamber to the joint channel via a control groove of the second piston. A first discharge channel is connected to the first metering chamber and controlled with a control groove of the second piston such that the control setting is opposite to that of the first feed connection.

A second metering chamber is disposed in the casing and is associated with a second end of the first piston. A second feed connection connects the second metering chamber to the joint channel via a control groove of the second piston, and a second discharge channel is connected to the second metering chamber and controlled with a control groove of the second piston such that the control setting is opposite to that of the second feed connection and of the first discharge channel.

A third metering chamber is disposed in the casing and is associated with a first end of the second piston. A third feed connection connects the third metering chamber to the joint channel via a control groove of the first piston, and a third discharge channel is connected to the third metering chamber and controlled with a control groove of the first piston such that the control setting is opposite to that of the third feed connection.

A fourth metering chamber is disposed in the casing and is associated with a second end of the second piston. A fourth feed connection connects the fourth metering chamber to the joint channel via a control groove of the first piston, and a fourth discharge channel is connected to the fourth metering chamber and controlled with a control groove of the first piston such that the control setting is opposite to that of the fourth feed connection and to that of the third discharge connection.

The connections and dispositions of the various metering chambers and discharge channels are such that the pistons are shifted successively and lubricant is transported from one of the metering chambers to a respective discharge channel.

In the above embodiment of the progressive distributor for lubricants, a discharge channel can be provided as an annular channel surrounding a metering chamber. A notch extending in axial direction can be disposed on a piston on the side toward a metering chamber. A piston end directed toward a metering chamber can have a narrowing ball shaped end section, a narrowing conical shaped end section or a narrowing step-shaped end section.

The present invention further provides a method for progressively distributing lubricants which comprises the following;

A first piston having a first groove and a second groove to provide respective control chambers is placed in a casing. A second piston having a third groove and a fourth groove to provide respective control chambers is also placed in the casing. Pressurized lubricant is fed to a joint channel for entry into a distribution system. Lubricant from a first feed connection connecting a first metering chamber associated with a first end of the first piston to the joint channel is passed via a control groove of the second piston. Lubricant is passed via a second discharge channel connected to a second metering chamber associated with a second end of the first piston and controlled with a control groove of the second piston. Lubricant is next passed via a fourth feed connection connecting a fourth metering chamber associated with a second end of the second piston to the joint channel via a control groove of the first piston. Lubricant is passed via a third discharge channel connected to a third metering chamber associated with a first end of the second piston and controlled with a control groove of the first piston. Lubricant is next passed via a second feed connection connecting the second metering chamber to the joint channel via a control groove of the second piston. Lubricant is passed via a first discharge channel connected to the first metering chamber. Lubricant is next passed via a third feed connection connecting the third metering chamber to the joint channel via a control groove of the first piston. Lubricant is passed via a fourth discharge channel connected to the fourth metering chamber and controlled with a control groove of the first piston. The four cycle process of passing lubricant effectively from the joint channel to respective discharge channels is continued.

This method for progressively distributing lubricants can further comprise collecting the lubricant in a discharge channel formed as an annular channel surrounding a metering chamber. It can further comprise passing some lubricant through a notch extending in axial direction disposed on a piston on the side toward a metering chamber or can comprise passing lubricant by a narrowing ball shaped end section, a narrowing conical shaped end section or a narrowing step-shaped end section of a piston end directed toward a metering chamber.

It is an advantage of the progressive distributor according to the present invention that, after the lubricant slides out from the corresponding metering chamber, the piston blocks the respective discharge channel and only a relatively small stroke, as far as the lubricant can be displaced by leakage, can be performed. Contact of the piston at the front face of the metering chamber does not occur or occurs only at substantially reduced speed in this case. Such a distributor therefore can be employed for high passage flow amounts and thus for a high operational frequency without the thereby occurring final position damping of the piston resulting in delay at the beginning. In particular, the final position damping of the pistons reduces the noise level considerably. The lubricant flowing via the feed channel into the metering chamber is moved out via the output and discharge channel based on so-called "forced circulation" such that the lubricant continuously remains in a flowing state. Dead zones are no longer generated and a hardening or, respectively, bleeding of the lubricant with high penetration no longer occurs. The forced circulation assures in addition a quick venting of the progressive distributor and excludes the occurrence of dummy transport.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing in which are shown several of the preferred features of the present invention.

DESCRIPTION OF INVENTION AND PREFERRED EMBODIMENT

In accordance with the present invention as provided, lubricants are distributed via a joint channel under pressure successively to several discharge ports. The distributor comprises at least two successively connected piston bore elements with in each case one piston provided with control grooves and disposed in a cylinder bore and slidable between two end positions. The piston subdivides the cylinder bore into two outer control chambers disposed on the two sides of the piston and into at least one intermediately disposed control chamber. In addition, several connecting channels are provided which connect the piston bore elements such that the piston, as long as the pressure of the lubricant is present in the feed line supply, is shifted according to a cylical sequence and this sequence results in the transportation of lubricant from a metering chamber via a control chamber to one of the output ports. Each metering chamber 17, 18 is provided with two separate channels 21, 22, 23, 24 providing a feed channel 21, 22 and a discharge channel 23, 24. The feed channel 21, 22 runs into the metering chamber 18 at an end region disposed oppositely to the respective piston front face. The discharge channel output port 23, 24 is disposed such that, under the effect of an insulating and stopping edge 29 and during piston shifting which reduces the size of the metering chamber 18, control of the discharge flow by the piston surface is furnished before the piston 8 reaches its final position.

The joining of the output of the discharge channel 23, 24 into the metering chamber 17, 18 can be formed as an annular channel surrounding the metering chamber 17, 18.

A groove or notch extending in an axial direction can be provided at the piston 8 in the region of its section 11, 12, which is disposed toward the metering chamber 17, 18.

The piston 8 can be provided with a narrowing end formed for example in conical, ball or stepped shape in the region of the sections 11, 12 with this end disposed toward the metering chamber 17, 18.

Figure 1:
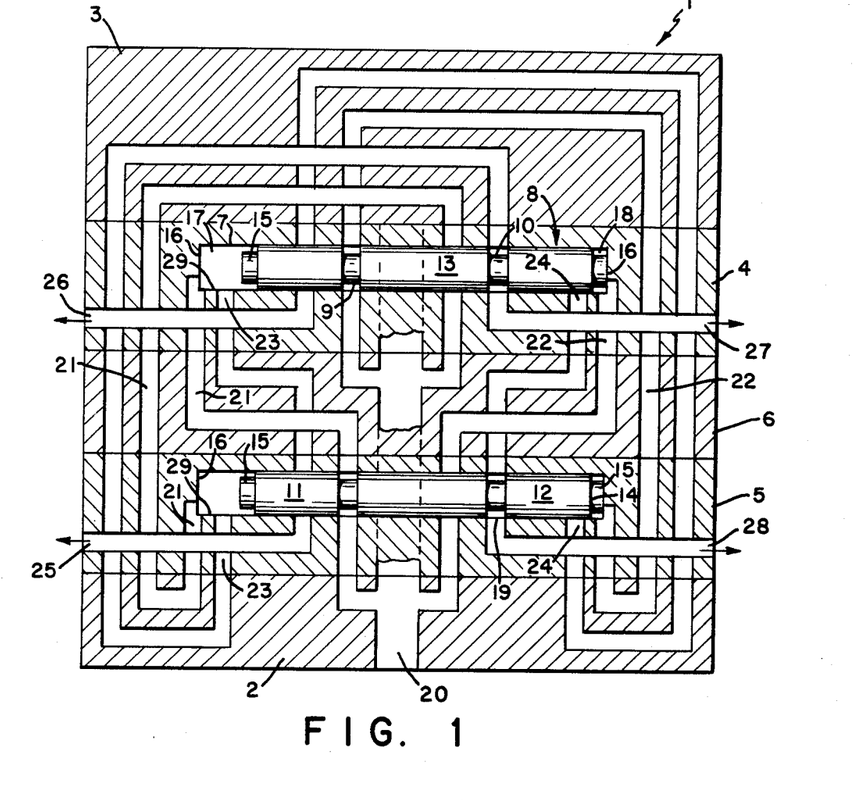
FIG. 1 is a schematic diagram of a casing incorporating two cylinders controlling the discharge and progressive distribution of lubricant.

Referring now to the drawing, there is shown a schematic view of the schematic functioning of a progressive distributor 1 operating as a disk distributor. The progressive distributor 1 comprises two end terminal plates 2, 3 and two disk-like piston elements 4, 5 disposed in between. If required, an intermediate plate 6 can be disposed between the two piston bore elements 4, 5. While the two terminal plates 2, 3 and the intermediate plates 6 are provided only with connecting channels, a cylinder bore 7 is provided in each piston bore element 4, 5. The piston 8 is guided tightly and axially shiftable in the cylinder bore 7.

The piston 8 is provided with two surrounding control grooves 9, 10 which are disposed at a distance from the ends and from each other. In each case, piston section 11, 12 follows the control group 9, 10, while the part of the piston 8 disposed between the control grooves 9, 10 forms a further section. In addition, each free front face 14 of the piston 8 carries a stumped and obtuse tenon 15. The so called "metering chambers" 17, 18, which determine the volume of lubricant furnished for each cycle are disposed between the free end of the piston 8 and the front face 16 of the cylinder bore 7. The remaining region of the cylinder bore 7 serves for guiding, sealing and controlling the piston 8.

A central feed channel 20 is provided in the terminal plate 2, which is connected to a lubricant feed supply line not shown here and which extends via the piston element 5 and the intermediate plate 6 to the piston bore element 4. If an additional intermediate plate 6 and piston bore elements 4, 5 are connected, then the feed channel is continued in the respective intermediate plates. In each case, a feed channel 21, 22 is led to the metering chamber 17, 18 of the two piston bore elements 4, 5 from the feed channel 20. At the same time, the discharge channels 23, 24 run to the output bores 25 to 28 from the metering chambers 17, 18.

The feed channels 21, 22 are disposed such that they join into the metering chamber 17, 18 close to the front faces 16. In addition, the discharge channels 23, 24 also run into the metering chamber 17, 18, where the discharge channels are provided at such a distance from the front face 16 of the bore hole that between each input feed channel 21, 22 and each output discharge channel 23, 24 of metering chamber 17, 18 there is formed a control edge 29 which is co-acting with piston section 11, 12 or, respectively, with the front face 14 of the piston 8. The length of the piston 15 is provided in this case such that piston section 11, 12 assuredly blocks the discharge channel 23, 24 in its respective final or, respectively, blocking position. This means that the piston section 11, 12 extends over the control edge 29 and the front face 14 of the piston 8 before the piston in each case reaches the front face 16.

The mode of operation of the described progressive distributor is based on the position of the pistons 8. It is assumed that the pistons 8 of the two piston bore elements 4, 5 assume their end position as illustrated in the drawing, and that all illustrated inner spaces are filled completely with lubricant. If now pressure is applied to the feed channel 20, then the pressure also acts via the input feed channel 22 in the metering chamber 18 of the piston element. All other connections are blocked. This has the result that the piston 8 moves the piston bore element 5 from its illustrated final position into another final position. Thereby the lubricant disposed in the metering chamber 17 is fed to the output 27 via the output channel 23. Due to the disposition of the output channel 23 relative to the control edge 29 and the length of the piston 15, the piston section 11 completely blocks the output channel even before the piston 8 has reached its other end position. The remaining lubricant in the metering chamber 17, which could not escape, effects final position damping of the piston 8 such that the piston 8 either does not touch or only after substantial damping touches with its tenon 15 the front face 16 of the cylinder bore 7 of the piston bore element 5.

This shifting of the piston 8 in the piston bore element 5 results in an increase of the pressure applied in the feed channel 20 via the input channel 22, which is now released by the piston section 13. This pressure builds up in the metering chamber 18 of the piston bore element 4 and immediately acts on the full cross section surface of the piston 8 since the tenon 15 does not come to rest at the front face 16 of the cylinder bore 7 in the case of an increased piston frequency. Thus, the piston 8 is thereby also shifted from its illustrated end position into the other end position. The lubricant disposed in the metering chamber 17 of the piston element 4 is fed via the discharge channel 23 to the discharge port 25. Here again the previously mentioned final position damping occurs.

If the piston 8 of the piston bore element 4 is shifted, then the piston section 13 releases the feed channel 21 via the control groove 10 to the metering chamber 17 of the piston bore element 5. The piston 8 of the piston bore element 5 is again shifted in the position illustrated here, where the lubricant disposed in the metering chamber 18 is released via the discharge channel 24 to the discharge port 26.

After this shifting, the input channel 21 is again opened to the metering chamber 17, and the piston 8 of the piston bore element 4 again returns to the starting position illustrated here. The lubricant present in the metering chamber 18 of the piston element 4 is fed to the discharge bore 28 via the discharge channel 24.

Following this step, the above described mode of operation of the progressive distributor 1 is repeated as long as the feed in via the feed channel 20 continues or a release is blocked due to a resistance coming from the outside.

The numerals as employed in the various figures refer to corresponding items in each case.

Figure 2:
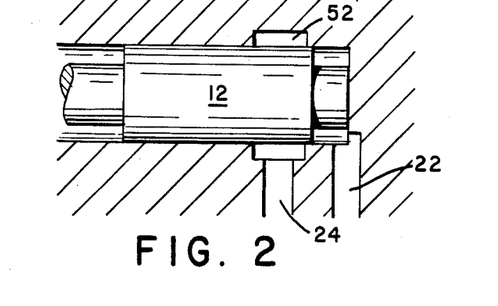
FIG. 2 is a view of another embodiment of the present invention illustrating an annular ring in the bore of the piston to collect discharge lubricant.

FIG. 2 illustrates another embodiment of the invention where the discharge port 24 is connected to the metering chamber via an annular ring 52 which surrounds the metering chamber. This allows relatively uniform flow of the lubricant for a substantial time while the piston surface begins to cover the control annular ring.

Figure 3:
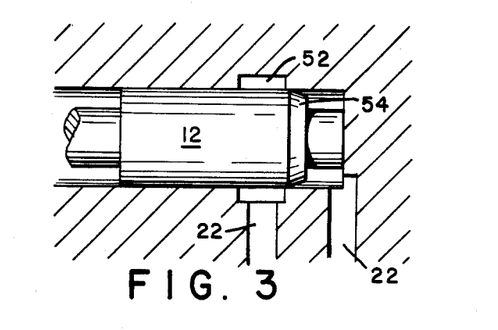
FIG. 3 is a view of a section of a further embodiment illustrating the form of the end of the piston as a frustocone.

FIG. 3 shows a further embodiment illustrating the narrowing of the end of the disk. As shown in FIG. 3, the piston can narrow down to the shape of a frustrated cone 54. Other forms of narrowing are also possible, for example a section through a sphere or through an ellipse could form the end part of the piston, or there could be provided steps resulting in a reduced diameter. These features are provided to improve the flow of the lubricant.

Figure 4:
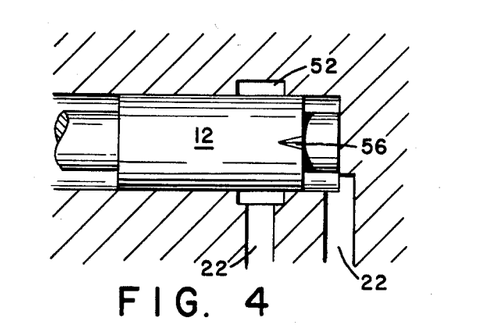
FIG. 4 is a view of a further embodiment illustrating the presence of a notch in the rim of the end of the piston.

FIG. 4 illustrates a further possibility of improving the flow of lubricant. The edge of the piston at its end face can be provided with notches or grooves which allow for a better and more appropriate flow of lubricant during the time when the piston surface covers the control element.

Figure 11:
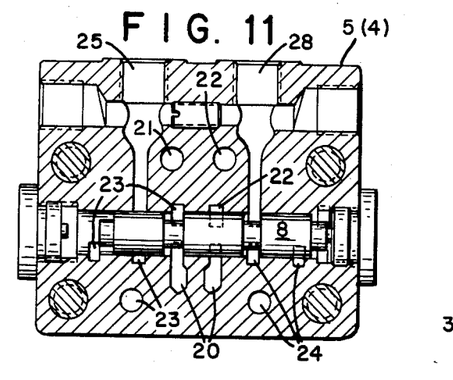
FIG. 11 is a schematic view of a proper distributor block.
Figure 12:
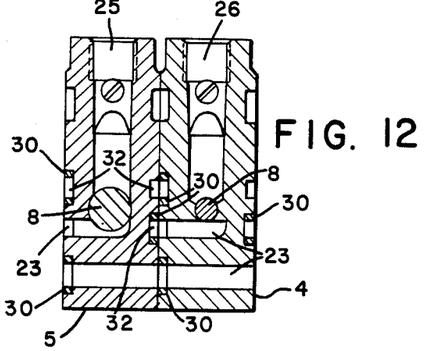
FIG. 12 is a schematic view of a proper distributor block.
Figure 13:
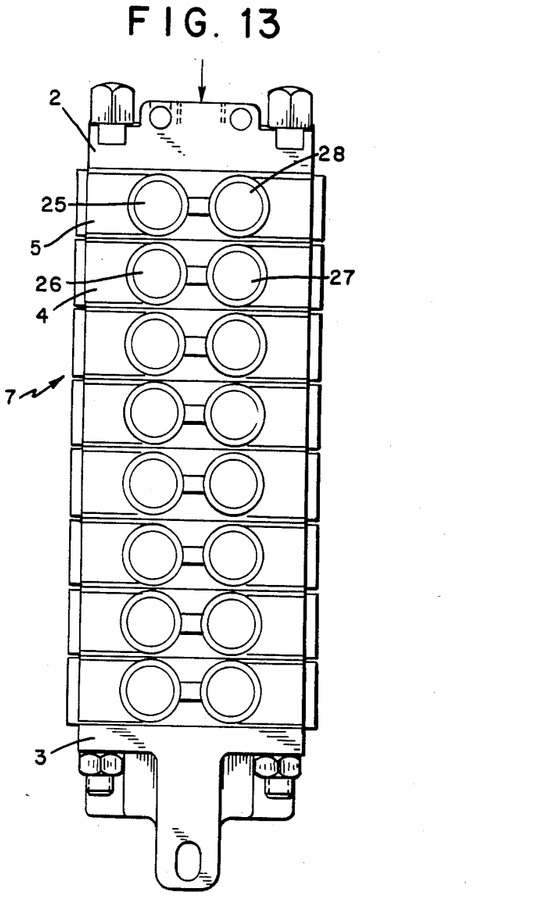
FIG. 13 illustrates a more or less complete progressive distributor with individual elements thereof shown in FIGS. 10 to 12.

Those numerals in FIGS. 5 to 13 which are the same as those shown in FIGS. 1 to 4 refer to like items in these FIGS. 5 to 13. FIGS. 5 to 9 illustrate individual parts of the progressive distributor 1. In these Figs., the distributor of FIG. 1 is shown with bore channels, and so-called intermediate plates are provided between the individual distributor blocks 4 and 5. FIGS. 13 illustrates a more or less complete progressive distributor with individual elements thereof shown in FIGS. 10 to 12.

Figure 5:
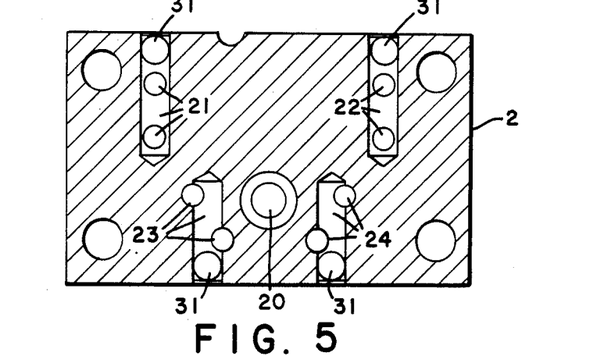
FIG. 5 is a schematic view of an end plate with an inlet port for lubrication fluid.

A view of the endplate 2 having an inlet port for lubrication fluid is shown in FIG. 5. The channels of the end plate 2 are cross-wise connected to the channels of the end plate 3 at the end of one run and before the start of the next process run for reversing the switching direction of all pistons. In particular, channel 21 has to be connected to channel 22 and channel 23 has to be connected to channel 24 and vice versa.

Figure 6:
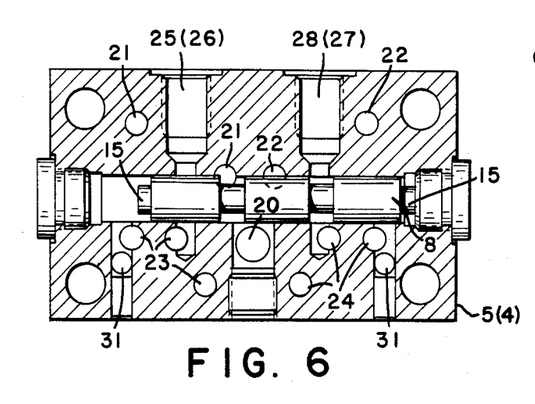
FIG. 6 is a schematic sectional view of a proper distributor block of the embodiment according to FIGS. 4 and 5.

A proper distributor block of the embodiment according to FIGS. 4 and 5 is illustrated schematically in FIG. 6.

Figure 7:
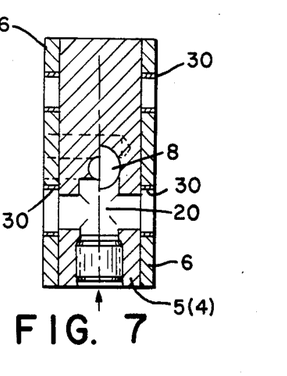
FIG. 7 is a schematic sectional view of the embodiment of FIG. 6 sectioning the inlet port.

The embodiment of FIG. 6 is further illustrated in FIG. 7 with a schematic sectioning of the inlet port 20.

Figure 8:
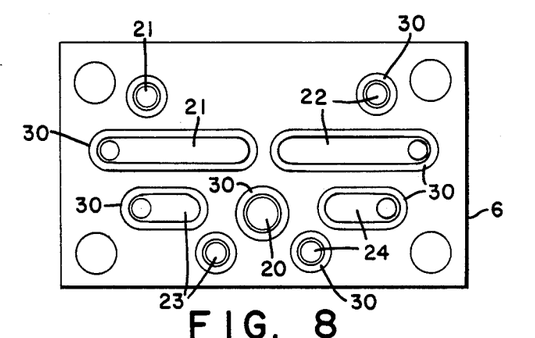
FIG. 8 is a schematic plan view onto an intermediate plate 6 which is provided with vulcanized sealing elements in the region of channels provided as recesses.

The intermediate plate 6 is shown schematically in FIG. 8 in a plan view. The intermediate plate 6 is provided with vulcanized sealing elements 30 in the region of channels provided as recesses. These sealing elements 30 assure the sealing of bores and channels upon the bolting together of the individual parts of the progressive distributor 1.

Figure 9:
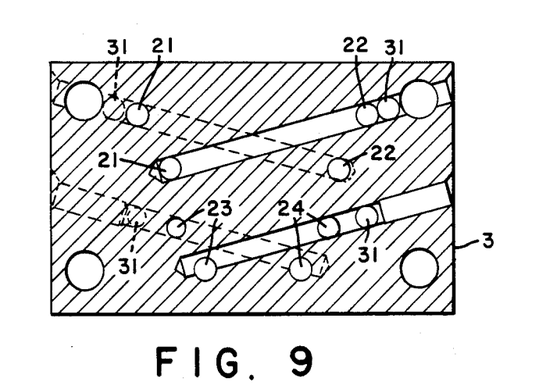
FIG. 9 is a view of a further embodiment of an end plate 3 of the progressive distributor comprising channels and bores.

The other end plate 3 of the progressive distributor comprising channels and bores is illustrated in FIG. 9, providing a further embodiment. Again channels and bores are milled into the other end plate 3. The bores, which do not receive external ports, are closed to the outside by balls 31 (compare FIGS. 5, 6, and 9).

Figure 10:
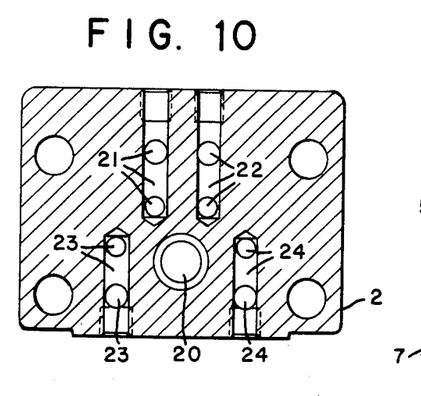
FIG. 10 is a schematic view of an end plate with an inlet port.

An end plate with an inlet port is illustrated schematically in FIG. 10. The end plate 2 is shown with an inlet port 20.

A distributor block 4 proper is shown schematically in FIG. 11. The distributor block of FIG. 11 is shown in FIG. 12 in a further sectional view. It can be recognized from FIG. 12 that the pistons 8 in the two neighboring distributor blocks 4 and 5 are furnished with different diameters and their metering volumes are therefore necessarily different. At least two successively disposed piston elements 4, 5 are each provided with a piston 8 in each case shiftable between two end positions in a cylinder bore 7 and provided with control grooves. This progressive distributor lacks in each case the intermediate plate 6. Here the object of running the channels and of sealing is performed by the distributor blocks 4, 5 themselves in contrast to the respective provision by intermediate plates 6 in other embodiments. For this purpose recesses 32 are provided at respective neighboring surfaces at the distributor blocks, which recesses serve to provide channels and which recesses are surrounded by sealing elements.

The assembled progressive distributor 1 according to FIG. 13 comprises the individual elements illustrated in FIGS. 10 to 12. The lubricant is fed into the progressive distributor 1 under pressure via a joint channel 20 and then is discharged in several discharge channels and ports 25 to 28. The piston elements 4, 5 are connected to each other such that the pistons 8 are shifted successively and that lubricant is transported from a metering chamber 17, 18 via a control chamber 19 to an output 25 to 28. In order to damp the piston 8 of the progressive distributor 1 in the respective end positions and in order to provide a forced circulation of the lubricant with a flushing of the connecting channels 21 to 24 and the metering chambers 17, 18 and thus in order to ensure a safe ventilation, each metering chamber 17, 18 is provided with two channels separate from each other 21, 22, 23, 24 which form an input feed channel 21, 22 and an output discharge channel 23, 24.

It will be understood that each of the elements described above, or two or more together, may also find a useful application in other types of progressive distributors of lubricants differing from the types described above.

While the invention has been illustrated and described as embodied in the context of a progressive distributor for lubricants, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A progressive distributor for lubricants comprising metering chambers;
   at least two successively connected piston bore elements;
   a piston for each piston bore element, which can be slid between two end positions and which piston is provided with control grooves, where the piston subdivides the piston bore element into two outer metering chambers and at least one intermediate control chamber;
   two separate channels forming a feed channel and a discharge channel connected to each metering chamber of a corresponding piston bore element, each channel passing through a corresponding intermediate control chamber of the other bore;
   a control edge formed in a wall of a piston associated with the other bore for interrupting the feed channel and the discharge channel at the corresponding intermediate control chamber based on the motion of the piston such that the several channels connecting the piston bore elements result in a successive shifting of the pistons thereby transporting lubricant from a metering chamber via a control chamber to a discharge port.

2. The progressive distributor for lubricants according to claim 1 wherein
   a discharge channel is provided as an annular channel surrounding a metering chamber.

3. The progressive distributor for lubricants according to claim 1 further comprising
   a notch extending in axial direction disposed on a piston on the side toward a metering chamber.

4. The progressive distributor for lubricants according to claim 1 further comprising
   a narrowing ball shaped end section of a piston end toward a metering chamber.

5. The progressive distributor for lubricants according to claim 1 further comprising
   a narrowing conical shaped end section of a piston end toward a metering chamber.

6. The progressive distributor for lubricants according to claim 1 further comprising
   a narrowing step-shaped end section of a piston end and directed toward a metering chamber.

7. A progressive distributor for lubricants comprising
   a casing;
   a first piston having a first groove and a second groove to provide respective control chambers;
   a second piston having a third groove and a fourth groove to provide respective control chambers;
   a joint channel for feeding pressurized lubricant to the distributor;
   a first metering chamber disposed in the casing and associated with a first end of the first piston;
   a first feed connection connecting the first metering chamber to the joint channel via a control groove of the second piston;
   a first discharge channel connected to the first metering chamber and controlled with a control groove of the second piston such that the control setting is opposite to that of the first feed connection;
   a second metering chamber disposed in the casing and associated with a second end of the first piston;
   a second feed connection connecting the second metering chamber to the joint channel via a control groove of the second piston;
   a second discharge channel connected to the second metering chamber and controlled with a control groove of the second piston such that the control setting is opposite to that of the second feed connection and of the first discharge channel;
   a third metering chamber disposed in the casing and associated with a first end of the second piston; a third feed connection connecting the third metering chamber to the joint channel via a control groove of the first piston;
   a third discharge channel connected to the third metering chamber and controlled with a control groove of the first piston such that the control setting is opposite to that of the third feed connection;
   a fourth metering chamber disposed in the casing and associated with a second end of the second piston;
   a fourth feed connection connecting the fourth metering chamber to the joint channel via a control groove of the first piston;
   a fourth discharge channel connected to the fourth metering chamber and controlled with a control groove of the first piston such that the control setting is opposite to that of the fourth feed connection and to that of the third discharge connection;
   such that the pistons are shifted successively and lubricant is transported from one of the metering chambers to a respective discharge channel.

8. The progressive distributor for lubricants according to claim 7 wherein
   a discharge channel is provided as an annular channel surrounding a metering chamber.

9. The progressive distributor for lubricants according to claim 7 further comprising
   a notch extending in axial direction disposed on a piston on the side toward a metering chamber.

10. The progressive distributor for lubricants according to claim 7 further comprising
a narrowing ball shaped end section of a piston end toward a metering chamber.

11. The progressive distributor for lubricants according to claim 7 further comprising
a narrowing conical shaped end section of a piston end and directed toward a metering chamber.

12. The progressive distributor for lubricants according to claim 7 further comprising
a narrowing step-shaped end section of a piston end toward a metering chamber.

13. A method for progressively distributing lubricants comprising
placing a first piston having a first groove and a second groove to provide respective control chambers in a casing;
placing a second piston having a third groove and a fourth groove to provide respective control chambers in a casing;
feeding pressurized lubricant to a joint channel for entry into a distribution system;
passing lubricant from a first feed connection connecting a first metering chamber associated with a first end of the first piston to the joint channel via a control groove of the second piston;
passing lubricant via a second discharge channel connected to a second metering chamber associated with a second end of the first piston and controlled with a control groove of the second piston;
next passing lubricant via a fourth feed connection connecting a fourth metering chamber associated with a second end of the second piston to the joint channel via a control groove of the first piston;
passing lubricant via a third discharge channel connected to a third metering chamber associated with a first end of the second piston and controlled with a control groove of the first piston;
next passing lubricant via a second feed connection connecting the second metering chamber to the joint channel via a control groove of the second piston;
passing lubricant via a first discharge channel connected to the first metering chamber;
next passing lubricant via a third feed connection connecting the third metering chamber to the joint channel via a control groove of the first piston;
passing lubricant via a fourth discharge channel connected to the fourth metering chamber and controlled with a control groove of the first piston; and
continuing the four cycle process of passing lubricant effectively from the joint channel to respective discharge channels.

14. The method for progressively distributing lubricants according to claim 13 further comprising
collecting the lubricant in a discharge channel formed as an annular channel surrounding a metering chamber.

15. The method for progressively distributing lubricants according to claim 13 further comprising
passing some lubricant through a notch extending in axial direction disposed on a piston on the side toward a metering chamber.

16. The method for progressively distributing lubricants according to claim 13 further comprising
passing some lubricant by a narrowing ball shaped end section of a piston end toward a metering chamber.

17. The method for progressively distributing lubricants according to claim 13 further comprising
passing some lubricant by a narrowing conical shaped end section of a piston end toward a metering chamber.

18. The method for progressively distributing lubricants according to claim 13 further comprising
passing some lubricant by a narrowing step-shaped end section of a piston end toward a metering chamber.

* * * * *